United States Patent [19]

Chapmond et al.

[11] Patent Number: 5,095,722
[45] Date of Patent: Mar. 17, 1992

[54] KAYAK AND SIMILARLY SHAPED OBJECT LOCKING DEVICE

[76] Inventors: Stanley T. Chapmond, 1304 Broadmoor, Austin, Tex. 78723-3122; Robert P. Tod, 3003 Lakeside Dr., Austin, Tex. 78723-2713

[21] Appl. No.: 644,225

[22] Filed: Jan. 18, 1991

[51] Int. Cl.⁵ .................. B60R 9/00; E05B 73/00
[52] U.S. Cl. ........................................ 70/18; 70/30; 70/58; 70/258; 114/172; 114/347; 224/315; 441/74
[58] Field of Search ............. 70/18, 14, 30, 49, 58, 70/57, 258, 260; 114/172, 347; 441/74, 75; 224/315

[56] References Cited

U.S. PATENT DOCUMENTS

| | | | |
|---|---|---|---|
| 3,959,995 | 6/1976 | Fletcher | 70/18 |
| 4,366,605 | 1/1983 | McKenney | 70/58 |
| 4,526,125 | 7/1985 | Bain, Jr. | 114/347 |
| 4,765,521 | 8/1988 | Finnegan | 224/315 |
| 4,823,568 | 4/1989 | Rogers et al. | 70/58 |
| 4,850,207 | 7/1989 | Ylven | 70/49 |
| 4,867,478 | 9/1989 | Anderson | 70/30 X |
| 4,896,519 | 1/1990 | Pitts | 70/18 X |

FOREIGN PATENT DOCUMENTS 3103783 9/1982 Fed. Rep. of Germany ........ 441/74
2118117 10/1983 United Kingdom ................ 224/315

*Primary Examiner*—Lloyd A. Gall

[57] ABSTRACT

A one piece locking device for securing kayaks and similarly shaped objects to stationary objects and automobile-mounted cartop carriers. The apparatus consists of a single plastic coated cable with a larger fixed loop at one end and two smaller fixed loops near and at the other end. The larger fixed loop is placed around one end of a kayak and the remaining cable passed under the crossbars of a cartop carrier and then around the opposite end of the kayak. By securing the two smaller fixed loops together with a lock, a loop is formed around this opposite end of the kayak. This newly formed loop and the larger fixed loop have approximately the same circumference, which is larger than the ends of the kayak but smaller than the cross-sectional circumference of the cockpit area of the kayak. The length of cable between the larger fixed loop and the newly formed loop is shorter than the kayak; thus when the two smaller fixed loops are secured together with a lock the apparatus forms a harness around the kayak preventing it from being dislodged from the cartop carrier. A second embodiment replaces the two smaller fixed loops with an affixed cable lock and an affixed locking pin, thus negating the need for a separate lock.

4 Claims, 2 Drawing Sheets

KAYAK AND SIMILARLY SHAPED OBJECT LOCKING DEVICE

BACKGROUND—FIELD OF INVENTION

This invention relates to a one piece locking device to secure kayaks and similarly shaped objects to a stationary object or a cartop carrier.

BACKGROUND—DESCRIPTION OF PRIOR ART

Kayaking is increasing in popularity as are other sports that utilize similarly shaped objects. With the rise in popularity has come a rise in theft. It is therefore desirable that an affordable one piece locking device be developed to secure the kayak or similarly shaped object to a stationary object or cartop carrier mounted on an automobile roof, to deter theft.

Prior art contains a number of locking devices for skis and other sporting devices, however, only one piece of prior art relates specifically to kayaks and similarly shaped objects. The Bain locking device U.S. Pat. No. 4,526,125) consists of 4 pieces of cable and two steel hoops. The Bain device contains a number of pieces, utilizing steel hoops that can damage the locked object. The circular steel hoops will not conform to the new generation of kayaks that are flatter and wider.

The disadvantages of the Bain locking device are:

The device contains multiple pieces; if one is lost the device is rendered inoperable.

The structure of the device won't conform to the shape of some of the newer kayaks.

The large rigid components may scratch the locked object as well as the automobile roof or stationary object to which the object is locked.

The device is cumbersome to install due to the number, bulkiness, and odd shapes of the pieces.

The shapes and designs of the various pieces make the device heavy.

The size of the components would prevent it from being carried in the kayak because the components are too large to fit through a kayak cockpit; thus it would not be available for locking the kayak during a shuttle.

The device is not conceived or designed, nor is it practical, for locking a kayak to a cartop carrier mounted on an automobile roof, because of its bulkiness, number of pieces, and potential for damage from the large rigid components.

Another locking device utilizes a cable to go around the seat of a kayak; however, some models of kayaks have no room between the wall of the kayak and the seat, making this type of lock inoperable.

OBJECTS AND ADVANTAGES

Accordingly, objects and advantages of our kayak and similarly shaped object locking device are:

to provide a one piece locking device that is flexible and easily conforms to the shape of the secured object; and to provide a one piece locking device constructed of one piece of cable, making it easier to store and less likely to become inoperable due to the loss of one of the pieces; and to provide a one piece locking device that will work on kayaks and similarly shaped objects that do not have an opening through which a piece of cable can be inserted; and to provide a one piece locking device that, due to its flexibility and protective plastic coating, will not scratch the finish of the kayak or automobile roof containing a cartop carrier on which the kayak or similarly shaped object is locked; and to provide a one piece locking device, which due to its protective plastic coating, will not rust; and to provide a one piece locking device which, when coiled into a small hand-sized package, can be easily carried inside the kayak, so that it is available for use during or at the end of a kayak trip, to lock the kayak; and to provide a one piece locking device which when carried in the kayak, can be used in various ways for rescue work [When uncoiled, the cable provides approximately 12 feet of length which can be tied to a rescue rope or used to attach a rescue rope to a large tree or rock. The device can also be used for attaching a rescue line to an entrapped kayak. A kayak entrapped against a rock or similar object in a river is often hard to rescue since, due to its shape, it is difficult to attach a rescue rope to it. The device can be installed quickly on the kayak, thus providing a harness with which to attach rescue ropes.]; and to provide a one piece locking device which can be easily installed; and to provide a one piece locking device which is light, compact, and easily carried.

Further objects and advantages of our invention will become apparent from consideration of the drawings and ensuing descriptions of it.

REFERENCE NUMERALS IN DRAWING

Figure 1:
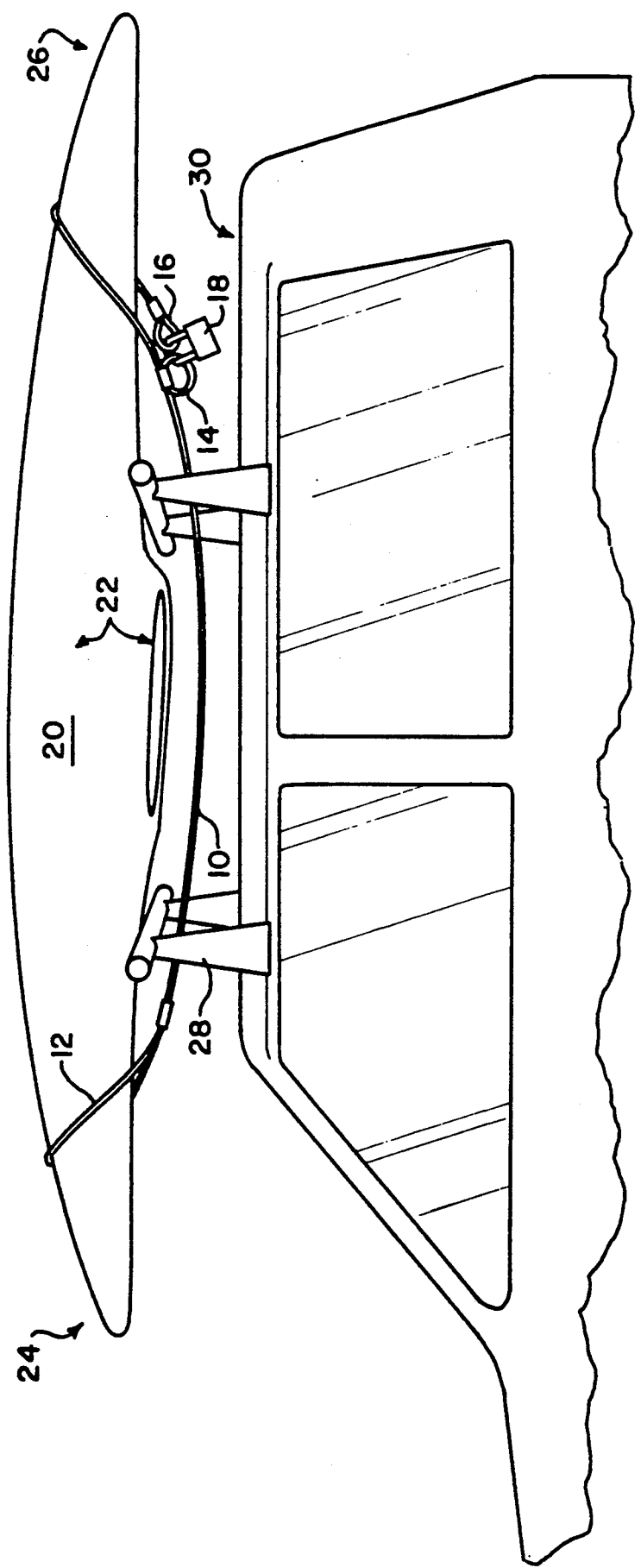
FIG. 1 is a perspective view of the device securing a kayak to a cartop carrier, which is attached to an automobile roof.

10. Cable
12. Larger fixed loop
14. Smaller fixed loop
16. Smaller fixed loop
18. Lock
20. Kayak
22. Cockpit area of kayak
24. End of kayak
26. Opposite end of kayak
28. Cartop carrier
30. Automobile roof
32. Affixed cable lock
34. Affixed locking pin

DESCRIPTIONS—FIGS. 1 TO 3

Referring to FIG. 1 of the drawings, a kayak is shown as an object larger at the middle cockpit area 22 than at the smaller more pointed ends 24 and 26. The invention is displayed securing a kayak 20; however the invention can be used to secure any object that is larger in circumference at the middle than at the ends.

The invention consists of one piece of cable 10, or similar material such as chain, rope, strap, wire, etc., all of which are included within the term cable; cut to a length dependent on the length of the kayak or similarly shaped object. A larger fixed loop 12 which is larger in circumference than the ends of the kayak 24 and 26, yet smaller in circumference than the cockpit area of the kayak 22, is formed at one end of the cable. A smaller fixed loop 14 is formed in the cable, at a distance from the end of the cable, which is determined by the length of the kayak or object to be secured. A second smaller fixed loop 16 is formed at the end of the cable.

Figure 2:
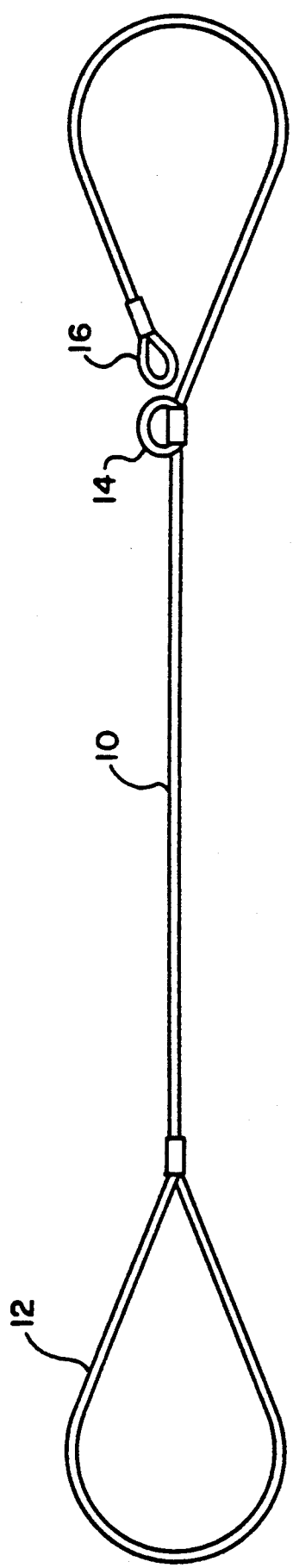
FIG. 2 is a perspective view of the device similar to FIG. 1, but without the kayak, automobile roof, and cartop carrier.
Figure 3:
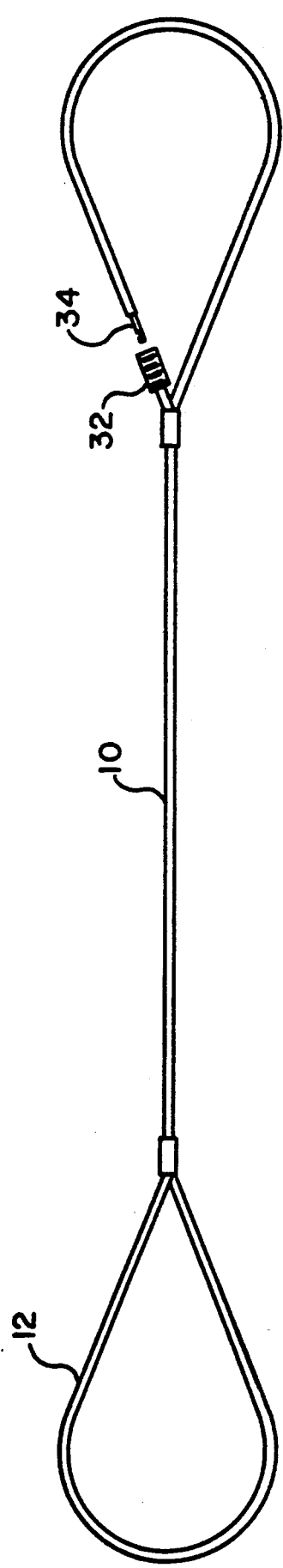
FIG. 3 is a perspective view similar to FIG. 2, but with an affixed cable lock and an affixed locking pin.

The second embodiment of the device, displayed in FIG. 3, is manufactured the same as the first embodiment displayed in FIGS. 1 and 2, except that one of the smaller fixed loops 14 is replaced with an affixed cable lock 32 and the second smaller fixed loop 16 is replaced with an affixed locking pin 34.

OPERATION

In the first embodiment (FIGS. 1 and 2) the larger fixed loop 12 is placed over one end of the kayak or similarly shaped object. The end of the cable with the two smaller fixed loops 14 and 16 is run under both cross bars of the cartop carrier 28 or around a stationary object. The cable is then placed around the other end of the kayak, and the two smaller fixed loops 14 and 16 are secured together with a lock 18.

In the second embodiment (FIG. 3) the larger fixed loop 12 is again placed over one end of the kayak or similarly shaped object. The end of the cable with the affixed cable lock 32 and affixed pin 34 is run under both cross bars of the cartop carrier 28 or around a stationary object. The end of the cable with the affixed locking pin 34 is placed around the kayak, and the affixed locking pin 34 is inserted into the affixed cable lock 32.

SUMMARY, RAMIFICATIONS, AND SCOPE

Thus the reader can ascertain that the kayak and similarly shaped object locking system can be used to secure kayaks and similarly shaped objects to a car top carrier or other stationary object. Additionally the locking system consists of one piece of cable that is easy to use and convenient to store. Furthermore, the locking system has the additional advantages of providing:

a one piece locking device that is flexible and easily conforms to the shape of the secured object; and a one piece locking device constructed of one piece of cable, making it easier to store and less likely to become inoperable due to the loss of one of the pieces; and a one piece locking device that will work on kayaks and similarly shaped objects that do not have an opening through which a piece of cable can be inserted; and a one piece locking device that, due to its flexibility and protective coating, will not scratch the finish of the kayak or automobile roof containing a cartop carrier on which the kayak or similarly shaped object is locked; and a one piece locking device, which due to its protective coating, will not rust; and a one piece locking device which, when coiled into a small hand-sized package, can be easily carried inside the kayak, so that it is available for use during or at the end of a kayak trip, to lock the kayak; and a one piece locking device which when carried in the kayak, can be used in various ways for rescue work [When uncoiled the cable provides approximately 12 feet of length which can be tied to a rescue rope or used to attach a rescue rope to a large tree or rock. The device can also be used for attaching a rescue line to an entrapped kayak. A kayak entrapped against a rock or similar object in a river is often hard to rescue since, due to its shape, it is difficult to tie a rescue rope to it. The device can be installed quickly on the kayak, thus providing a harness with which to attach rescue ropes.]; and a one piece locking device which can be easily installed; and a one piece locking device which is light, compact, and easily carried.

Although the description above contains many specificities, these should not be used to limit the scope of potential applications of the invention, nor should the description be used to limit the scope of materials used to construct the invention. For instance, the locking device could be used to secure surfboards, sail boards and any object with smaller circumference ends and broader middles. Additionally, it may be possible that more sophisticated building materials may become available, making it possible to make the device lighter, stronger, or more flexible.

We claim:

1. In combination with a kayak, a means of securing said kayak to an object, comprising a single cable which is configured with a larger fixed loop on one end and two smaller loops on the opposite end, said larger fixed loop placed around one end of said kayak and said cable passed around said object and subsequently wrapped around the opposite end of said kayak with the length of cable between said smaller loops forming a loop around said opposite end of said kayak such that by securing said smaller fixed loops to each other, said kayak is secured to said object.

2. The combination as recited in claim 1, wherein said larger fixed loop and said loop formed by securing said smaller fixed loops together each have a circumference larger than the respective ends of said kayak and smaller than the cross-sectional circumference of the cockpit area of said kayak.

3. The combination as recited in claim 1, wherein the length of cable between said larger fixed loop and said loop formed by securing said smaller fixed loops together is shorter than the length of said kayak and long enough to pass around said object.

4. The combination as recited in claim 1, wherein a cable lock is affixed near said opposite end of said cable, and a locking pin is affixed on said opposite end of said cable to form said loop around said opposite end of said kayak.

* * * * *